United States Patent
Simons

(10) Patent No.: US 9,543,989 B2
(45) Date of Patent: Jan. 10, 2017

(54) MULTICHANNEL TRANSPONDER AND A METHOD OF DETERMINING A MOST STRONGLY COUPLED CHANNEL OR MORE STRONGLY COUPLED CHANNELS

(71) Applicant: NXP B.V., Eindhoven (NL)

(72) Inventor: Sven Simons, Graz (AT)

(73) Assignee: NXP B.V., Eindhoven (NL)

( * ) Notice: Subject to any disclaimer, the term of this patent is extended or adjusted under 35 U.S.C. 154(b) by 12 days.

(21) Appl. No.: 14/320,960

(22) Filed: Jul. 1, 2014

(65) Prior Publication Data
US 2015/0031311 A1   Jan. 29, 2015

(30) Foreign Application Priority Data
Jul. 25, 2013  (EP) ..................................... 13177982

(51) Int. Cl.
*H04B 1/00* (2006.01)
*H04B 5/00* (2006.01)
*G06K 19/07* (2006.01)

(52) U.S. Cl.
CPC .......... *H04B 1/0064* (2013.01); *H04B 5/0068* (2013.01); *H04B 5/0081* (2013.01); *G06K 19/0726* (2013.01)

(58) Field of Classification Search
CPC ............ H04L 25/062; H03D 5/00; H03K 7/08
See application file for complete search history.

(56) References Cited

U.S. PATENT DOCUMENTS

| | | | | |
|---|---|---|---|---|
| 4,361,153 A | * | 11/1982 | Slocum et al. | 607/32 |
| 5,698,838 A | * | 12/1997 | Yamaguchi | G06K 19/0723 235/439 |
| 6,650,226 B1 | * | 11/2003 | Wuidart | G06K 7/0008 340/10.1 |
| 7,103,460 B1 | * | 9/2006 | Breed | 701/32.9 |
| 7,260,371 B1 | * | 8/2007 | Yones | H04W 52/42 340/10.1 |
| 7,317,307 B2 | | 1/2008 | Fischer | |

(Continued)

FOREIGN PATENT DOCUMENTS

| | | |
|---|---|---|
| CN | 1671065 A | 9/2005 |
| CN | 1965323 A | 5/2007 |

(Continued)

OTHER PUBLICATIONS

Extended European Search Report for EP Patent Appln. No. 13177982.9 (Jan. 24, 0214).

*Primary Examiner* — Bobbak Safaipour

(57) ABSTRACT

A transponder is disclosed comprising a multichannel front-end circuit; each channel of the multichannel front-end circuit a resonant circuit associated with a respective antenna and producing, in use, an input voltage; a conditioning circuit configured to provide a conditioned input voltage from the input voltage, and a comparator configured to compare the conditioned input voltage with a reference voltage; wherein the front-end circuit further comprises: a variable load connectable across each of the resonant circuits, and a controller configured to, in use, vary the variable load and detect an output from each of the comparators.

A method of operating such a transponder to determine a most strongly coupled channel, or more strongly coupled channels, is also disclosed.

13 Claims, 3 Drawing Sheets

(56) References Cited

U.S. PATENT DOCUMENTS

| | | |
|---|---|---|
| 7,602,274 B2 | 10/2009 | Lee |
| 7,711,332 B2* | 5/2010 | Murdoch ..................... 455/107 |
| 2002/0080864 A1* | 6/2002 | Kuttruff et al. ............... 375/211 |
| 2003/0067396 A1* | 4/2003 | Hassett .................. C07K 14/44 340/8.1 |
| 2003/0227323 A1* | 12/2003 | Enguent ........................ 329/345 |
| 2004/0210289 A1* | 10/2004 | Wang et al. .................. 607/116 |
| 2004/0254419 A1* | 12/2004 | Wang et al. ...................... 600/8 |
| 2005/0087599 A1* | 4/2005 | Ward et al. .................... 235/451 |
| 2005/0095197 A1* | 5/2005 | Tuszynski et al. .......... 424/1.11 |
| 2006/0125553 A1* | 6/2006 | Enguent ........................ 329/347 |
| 2006/0286938 A1 | 12/2006 | Murdoch |
| 2010/0144270 A1 | 6/2010 | Gomez et al. |
| 2010/0245039 A1 | 9/2010 | Tokunaga |
| 2010/0290368 A1* | 11/2010 | Meier et al. .................. 370/278 |
| 2012/0105219 A1 | 5/2012 | Kofler |
| 2012/0119884 A1 | 5/2012 | Nehrig et al. |
| 2015/0022322 A1 | 1/2015 | Ziegler |
| 2016/0006369 A1* | 1/2016 | Zoescher .............. H02M 7/217 455/73 |

FOREIGN PATENT DOCUMENTS

| | | |
|---|---|---|
| CN | 102545395 A | 7/2012 |
| CN | 102545395 A | 7/2012 |
| EP | 2027658 A1 | 2/2009 |
| EP | 2448135 A1 | 5/2012 |
| JP | 2006039899 A | 2/2006 |
| WO | 2007/066267 A2 | 6/2007 |
| WO | 2013/043734 A1 | 3/2013 |

\* cited by examiner

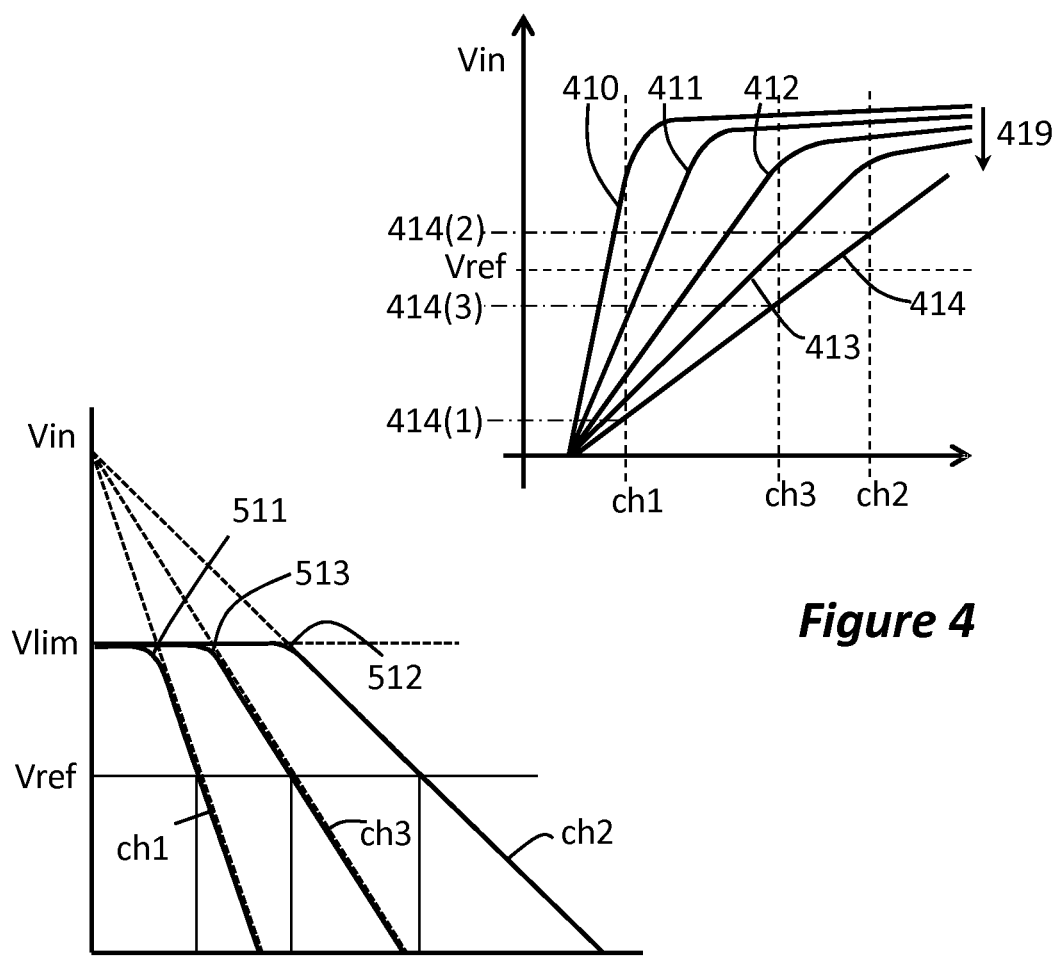

MULTICHANNEL TRANSPONDER AND A METHOD OF DETERMINING A MOST STRONGLY COUPLED CHANNEL OR MORE STRONGLY COUPLED CHANNELS

CROSS-REFERENCE TO RELATED APPLICATIONS

This application claims the priority under 35 U.S.C. §119 of European patent application no. 13177982.9 filed on Jul. 25, 2013, the contents of which are incorporated by reference herein.

FIELD

This invention relates to multichannel transponders, and to methods of determining the most strongly coupled channel or more strongly coupled channels.

BACKGROUND

Wireless systems are commonly used to transmit information from a first device, such as a base-station, to a second device, such as a key. Moreover, such wireless systems typically involve transmitting information from the second device to the first device, to provide bi-directional communication of information. The second device may then be termed a transponder.

In some applications, the second device may not include its own power supply, and in such applications, it is well known for the second device to obtain the power it requires to operate from external sources by scavenging power or energy. One particular example of such energy scavenging is the use of the energy associated with the transmission of information from the first device, to provide the power for the second device to transmit information back to the first device. Such a system may be termed a field-supplied application. Partly due to the possibility of relatively high powers in the field, such field-supplied applications are particularly prevalent in RFID applications, in which the second device may be, for instance, a passive RFID transponder, or other NFC (near field communication) applications.

In order to efficiently receive power, or to efficiently transmit information, it is important that the front-end circuit of a field supplied application is well-coupled to the field transmitted from and supplied by the base station. It is well-known that the coupling between the field and the antenna coil in the front-end circuit of a transponder is heavily dependent on relative orientation of the antenna coil in the front-end circuit relative to the orientation of the field. In vector terms the coupling depends on the dot product between the two orientations. If the orientations are orthogonal, there will be little or no coupling, and thus the device may not work. In order to prevent this, it is known to include two or three, generally or substantially orthogonal, front-end circuits in the transponder, in order to ensure that at least one circuit is well coupled to the fields. Each front-end circuit may be considered as a separate channel. An immobilizer device includes three orthogonally-oriented antennas configured to receive a signal from a field generated by a base station is disclosed in United Stated patent application publication number US2012/0105219.

In order to utilise the available energy most efficiently, it may be desirable to choose one of the two or three separate channels, and transmit information only on that channel, disabling the other channels. Such a system is disclosed in United States patent application publication number US 2010/0290368, which discloses a half-duplex RFID transponder with an integrated three-dimensional front-end circuit which includes three LC resonant circuits arranged in a three-dimensional configuration. A channel selector is adapted to detect which one of three storage capacitors associated with respective channels, is first charged with a threshold voltage, to select the receiver channel associated to the LC resonant circuit which is coupled to the storage capacitor which is first charged and to deactivate the two other receiver channels.

It would be desirable to provide an alternative method of detection of the most strongly coupled channel, and an associated device.

SUMMARY

According to a first aspect there is provided a transponder comprising a multichannel front-end circuit; each channel of the multichannel front-end circuit comprising: a resonant circuit associated with a respective antenna and producing, in use, an input voltage; a conditioning circuit configured to provide a conditioned input voltage from the input voltage, and a comparator configured to compare the conditioned input voltage with a reference voltage; wherein the front-end circuit further comprises: a variable load connectable across each of the resonant circuits, and a controller configured to, in use, vary the variable load and detect an output from each of the comparators.

In embodiments, the conditioning circuit comprises a rectifier for rectifying the input voltage. In embodiments, the conditioning circuit further comprises a parallel combination of a capacitor and a resistor, for producing a voltage envelope. The capacitor may be a smoothing capacitor. The resistor may be a dissipating resistor. The circuit may provide for shaping an envelope of the input voltage. Such a circuit is convenient, and does not generally require many components. Other embodiments may comprise different conditioning circuits; in particular and without limitation the conditioning circuit may comprise an active peak amplifier circuit. The conditioning circuit provides a first input to a comparator. The comparator may be, without limitation, a sample and hold comparator or a peak level comparator, and produces a specific output, which may be a "high" output, if the condition is met that its first input exceeds its second input. The specific output may be provided only whilst the condition is met, or for a longer period.

In embodiments the variable load is stepwise variable. A stepwise variable load may be particularly convenient to implement.

In embodiments a separate respective variable load is connectable across each of the resonant circuits. However, in other embodiments a single variable load is connectable across each of the resonant circuits. Providing a single variable load which is connectable, for instance by switching, to each of the resonant circuits may allow for a generally lower component count, and in particular fewer passive components; however this may be at the expense of a more complex circuit particularly as regards the switching, and it may not be as straightforward to ensure the total load is the same across each of the channels, should that be required or desirable.

In embodiments the antennae are configured to be coupled, in use, to the near field of the electromagnetic field. Alternatively or in addition, the antennae may be configured to be coupled, in use, to the far field of the electromagnetic field.

According to another aspect there is provided a method of operating a transponder having a multichannel front-end circuit, and being in an electromagnetic field, wherein each channel comprises a resonant circuit associated with a respective antenna, the method comprising: varying a load across each of the resonant circuits; comparing a respective conditioned input derived from a respective voltage across each of the resonant circuits with a predetermined reference voltage; and determining which channel is most strongly coupled to the field, in response to the comparison.

The voltage across each resonant circuit may be rectified and may be connected to a ground by a parallel combination of a capacitor and a resistor, to derive the respective conditioned input voltage. The capacitor may be a smoothing capacitor. The resistor may be a dissipating resistor. The circuit may provide for shaping an envelope of the input voltage.

In embodiments varying a load across each of the resonant circuits comprises a stepwise variation of the load. In embodiments a separate respective variable load is connectable across each of the resonant circuits. In embodiments the antennae are configured to be coupled, in use, to the near field of the electromagnetic field.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which

FIG. 4 shows the effect of increasing a variable coil load, on the relationship between the input voltage and field strength;

FIG. 5 shows the variation of input voltage with load for three different couples channels; and FIG. 6 illustrates a method according to embodiments for selecting the most strongly coupled channel.

Figure 1:
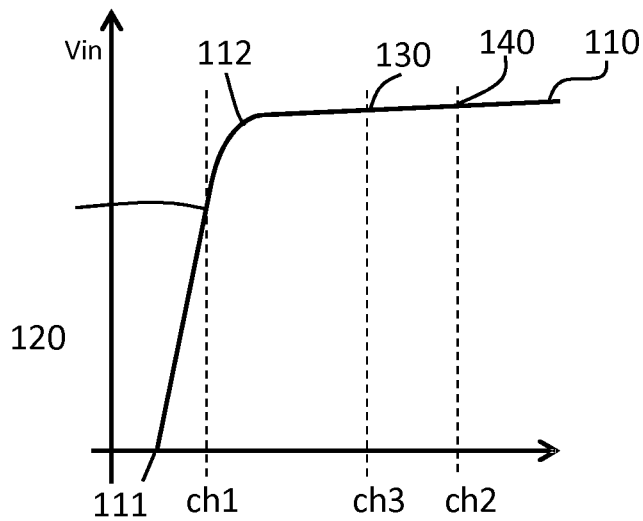
FIG. 1 illustrates the variation of input voltage with field strength for a field supplied transponder.

It should be noted that the Figures are diagrammatic and not drawn to scale. Relative dimensions and proportions of parts of these figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Detection of the field strength may be based on the input voltage of each channel, where the channels may correspond to different, generally orthogonal, orientations of the antenna coil in a front-end circuit of a transponder. However, transponders typically include rectifiers for energy harvesting, and the largest part of the current is drawn from the strongest channel, which would reduce the voltage difference between channels. Moreover, a voltage limiter for device protection is typically required, in order to keep the devices within allowed voltage range for the process which generally has a relatively steep response. The combination of these two effects results in the amplitude of the input voltage signal generally not showing sufficient variation all over most of the field strength range. This is shown in FIG. 1.

Figure 3A:
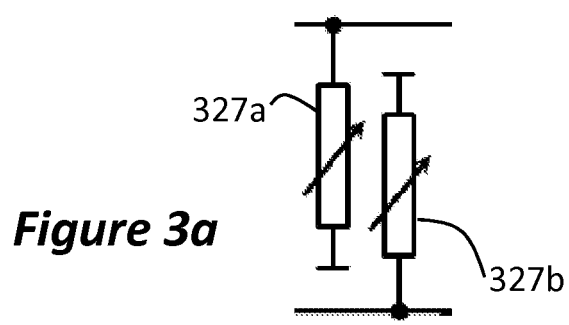
FIG. 3a shows a pair of grounded, variable resistors.
Figure 3:
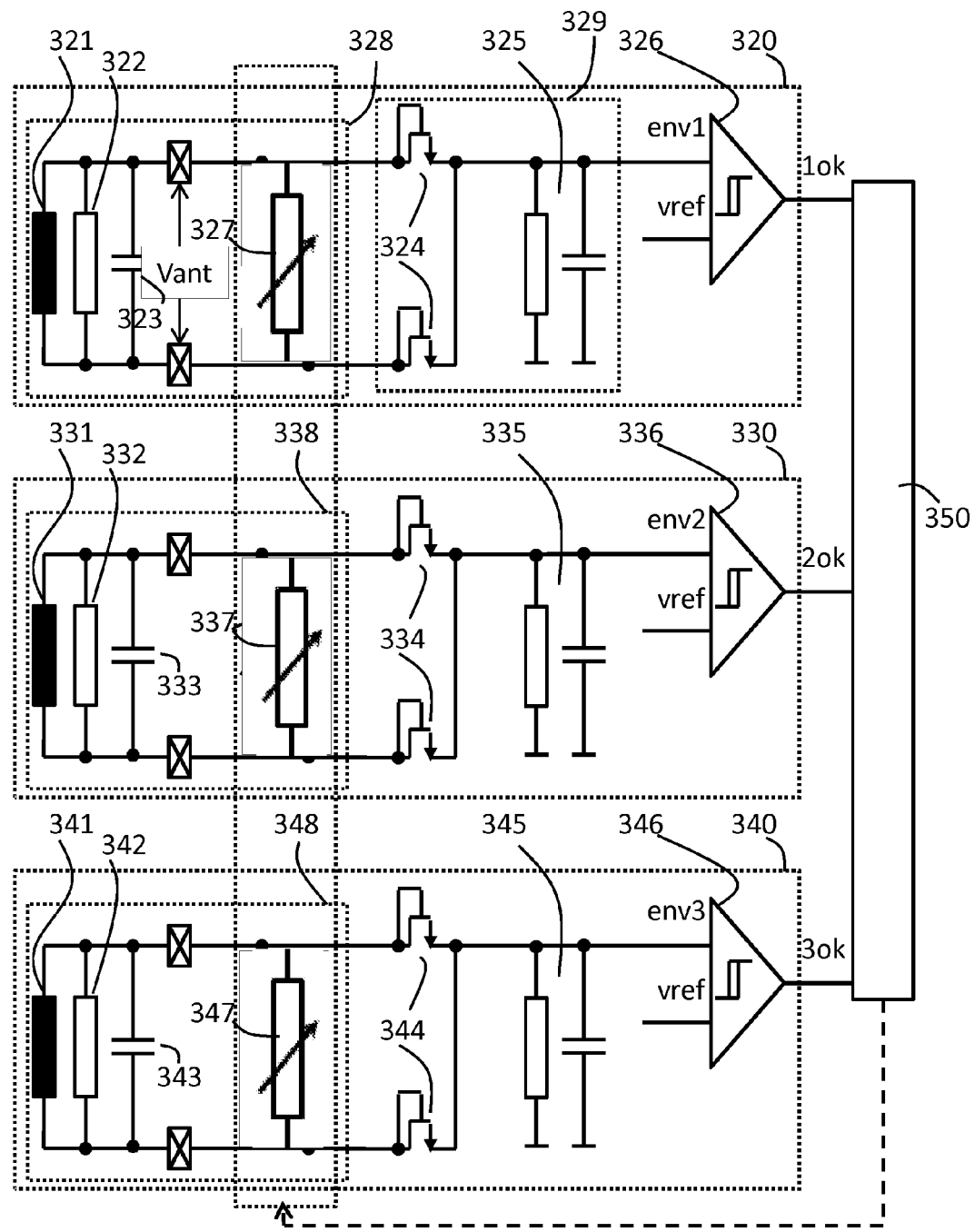
FIG. 3 shows the system overview of a transponder having a multichannel front-end circuit comprising three channels according to an embodiment.

FIG. 1 illustrates the variation of conditioned input voltage with coupled field strength for a field-supplied transponder, at curve 110, and plots the conditioned input voltage, Vin, on the y-axis or ordinate against the coupled field strengths on the x-axis or abscissa. As will be discussed in more detail below with reference to FIG. 3, the conditioned input voltage Vin is related to the input voltage, at Vant, but has been rectified by a rectifier 324 and subjected to further conditioning—typically by an envelope shaper 325 as shown in FIG. 3 or an active peak circuit. Below a particular coupled field strength, shown at 111, the field is not strong enough to result in any conditioned input voltage in the transponder. As the field strength increases, the conditioned input voltage amplitude increases approximately linearly until it reaches a knee, shown at 112, at which value the amplitude becomes almost constant with increasing coupled field strength. This may be considered to be the result of two effects: firstly, a rectifier is often connected to the input in order to scavenge energy from the input fields. Secondly such transponders typically comprise a voltage limiter circuit. A voltage limiter circuit provides for protection of the device, and may have a relatively steep response is such that, with increasing your field strength, the input amplitude is generally flat. As mentioned above, in this case no conditioned input voltage results unless the coupled field strength is at least equal to a certain minimum value as shown at 111. This offset may result from the inclusion of the rectifier in the conditioning circuit, and thus the corresponding voltage offset on the y-axis may be equivalent to the smallest threshold voltage of the diodes (or transistors) used in the rectifier. In other circuits, in which a rectifier is not included, the offset may not be present, and the steep part 120 of the curve may start at the origin.

FIG. 1 includes example coupled field strengths for three channels, ch1, ch2 and ch3, which may correspond to front-end circuits having generally substantially orthogonal loop antennae. As shown, the conditioned input voltage on channel 1, shown at 120, is less than the maximum conditioned input voltage, since it is on the steep part of the curve. However the conditioned input voltages on channels two and three, shown at 130 and 140 respectively, are substantially the same, since they both lie on the voltage limited part of the response curve. Thus from merely measuring the conditioned input voltage, it is not possible to determine whether there is a stronger coupling to channel 2 or to channel 3.

Figure 2:
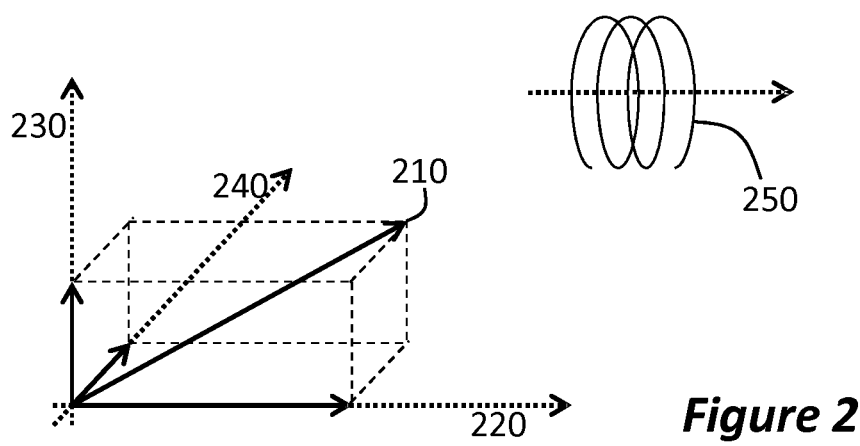
FIG. 2 shows the coupling between a field vector and three orthogonal directions.

FIG. 2 illustrates the coupling of a field 210, which typically for an RFID application may be the "near field", to three orthogonal directions corresponding to the X axis 220, the Y axis 230, and the Z axis 240. As will be appreciated by the skilled person, the coupling corresponds to the dot product between the field vector and a vector representing each of the axes. Thus, in the case of a multichannel transponder which has three front end circuits having orthogonal respective loop antenna with a vector axis 250, and aligned to the X, Y, and Z axis as shown, the skilled person will appreciate that the coupling of the field into the antenna will depend on the relative orientation of the field to the antennae.

FIG. 3 shows the system overview of a transponder 310 comprising a multichannel front-end circuit having three channels 320, 330 and 340. Each front-end circuit has an antenna circuit, which comprises an antenna 321, 331, 341 which may an inductor in form of a loop or coil, with corresponding resistance 322, 332, 342 and capacitance 323, 333, 343. Together these form a resonant circuit 328, 338, 348. An input voltage Vant may be seen across the antenna circuit. The input voltage Vant from the antenna circuit is conditioned by means of an envelope shaper, 329, 339, 349, and supplied as one input, env1, env2, env3 to a comparator 326, 336, 346. The envelope shaper includes a rectifier 324, 334, 344 to convert the AC antenna voltage Vant to a DC signal. As will be familiar to the skilled person, the envelope shaper may, as shown in FIG. 3 at 325, 335, 345, may comprise a capacitor to smooth the voltage which has been rectified by the rectifier 234, and a load to allow for the slow dissipation of charge, in order to allow the DC voltage to follow a falling input voltage slowly, and thereby avoid that the signal would always stay high. In other embodiments, a biased current to ground may be used instead of the resistor. In the circuit shown, this resistor may be the only means to dissipate charge. In other embodiments, as the skilled person will appreciate, an envelope shaper is not included, but other conditioning circuitry may be applied. In particular, the conditioning circuit may include an active peak circuit: such a circuit may include an amplifier, and detect the peak voltage and then condition the voltage, for instance by a sample and hold mechanism.

The conditioned input signal is supplied as one input, env1, env2, env3 to a comparator 326, 336, 346. The other input to the comparator is a threshold voltage vref. The comparator 326, 336, 346 thus determines whether the conditioned input voltage exceeds a reference voltage vref, and provides an output to common control logic 350.

Connected to the resonant circuit 328, 338, 348, that is to say, included in or coupled across it, for each of the front-end circuits, is a variable load 327, 337, 347. As shown in FIG. 3 this variable load may be a resistive load. Alternatively or in addition it may comprise a reactive component. By including a variable load in the circuit, a change in the field strength may result in a change in the conditioned input voltage, which varies with the load; as a result, as will be described in more detail hereinbelow, it may be possible to distinguish between the coupling of different antenna to the field. The variable load may be a single variable resistor, as shown in 327; alternatively and without limitation, the variable load may comprise two resistors 327a, 327b, each grounded, as shown in FIG. 3a. Furthermore, it will be appreciated, that although the figures depict continuously variable resistors, the resistor may alternatively be step-wise variable—such as, for instance may be provided by a network of resistors and will be familiar to the skilled person.

Although, as shown in FIG. 3 a separate variable load is provided in each of the channels, in other embodiments one or more variable loads may be provided which may be switched between the channels. This may provide a saving in terms of the number of components which are required. Similarly it may be possible to replace the separate comparison circuits for vref, with a single circuit which is switchable between channels. However, such a circuit may require additional complexity.

FIG. 4 shows the effect of increasing the value of the variable load on the relationship between the conditioned input voltage and field strength: the figure shows, on the y-axis or ordinate, the conditioned input voltage resulting from the coupling of an antenna to a field. The field strength is plotted on the x-axis or abscissa. Each of the plots 410 to 414 corresponds generally to the curve 110 in FIG. 1. Curve 410 corresponds directly curve 110, in which the variable load has a zero value. The skilled person will appreciate that there may be a baseline load, in series with the variable load 327. However such a baseline load may be considered to be part of the resistance 322 of the antenna circuit. In other embodiments the variable load may comprise a capacitance, and may in particular a variable capacitance. The skilled person will appreciate that the effect of a variable capacitance would be to de-tune the circuit, rather than directly increase the load; directly increasing the load may in general be simpler or more straightforward to implement, Curves 411, 412, 413, 414 correspond to increasing values of the variable load 327 (indicated by 419). It will be observed that, as the load increases, the rate of change of conditioned input voltage with increasing field strength decreases: as a result, the knee of the curve at which the voltage limiter starts to limit the conditioned input voltage moves to the right, that is to say, to a higher coupled field strength.

The figure also shows the coupled field strengths, ch1, ch2 and ch3, for the three channels corresponding to generally orthogonal antenna described with reference to FIG. 1. As can be seen, as the load increases, it becomes possible to distinguish between the relative levels of coupling, not just of ch1, but ch2 and ch3. In particular, with a large load, corresponding to curve 414, separate conditioned input voltages 414(1), 414(2) and 414(3) are measurable. Thus, by increasing the load, it is possible to determine which of the channels has the strongest coupling to the field.

It will be appreciated that providing a high load, such as is shown in curve 414, is inefficient since a relatively large amount of power is wasted in the load. By making the load variable or switchable, it may be possible to apply that load during only a part of the operational time, in order to not waste this power during normal operation and once the strongest coupled channel has been identified or established.

FIG. 5 shows curves of the measurable conditioned input voltage Vin, on the y-axis or ordinate, as the load is increased, with the load being shown on the x-axis or abscissa, for a specific or fixed field strength. For completeness, it should be mentioned, that although the figure is not drawn to scale, in general, the x-axis will be a linear scale, whereas the y-axis will be a logarithmic scale. For low values of the variable load, the conditioned input voltage from each of the channels is limited by the voltage limiter to the value shown at Vlim. As the load is increased, ch1, which is the most weakly coupled channel, no longer can provide sufficient power to power the variable load at the limit voltage, and as a result the conditioned input voltage starts to fall, as shown at 511. The same effect occurs for the other two channels, at higher values of the variable load, as shown at 513 and 512 respectively. Considering now a lower voltage level, shown in FIG. 5 as Vref, it will be apparent to the skilled person that, as the variable load is increased, the order in which the conditioned input voltage of the respective channels falls below Vref corresponds to the order of the coupling of the channels to the field—with the weakest channel being the first to fall below Vref, and the strongest coupled channel being the last to fall below Vref, as the variable load is increased. Thus, by using a threshold voltage, which may be a predetermined or fixed voltage Vref, it may be possible to determine which channel is most strongly coupled to the field. Furthermore, it may be possible to determine which channels are more strongly coupled to the field: in the case of three channels, the two more strongly coupled channels will be those other than the one which first falls below Vref.

The skilled person will appreciate that due to the presence of three orthogonal directions corresponding to the three conventional Cartesian co-ordinates x, y and z, in Euclidean geometry, it will be most common for there to be three channels. However, there may be specific instance were fewer or more than three channels are provided—for instance, in circumstance involving tetrahedral geometries, or others in which it may be desirable to ensure that there is at least one channel which is more closely aligned to the first than at 45°. It such cases, it may be desirable to identify, for instance, the two, or three more strongly coupled channel, in which case, load may be increased—typically stepwise, until only the desired number of channels remain with their respective conditioned input voltage higher than Vref.

This effect allows for a convenient implementation of a method to determine the channel which the most strongly coupled (or the channels which are more strongly coupled) to a field, as illustrated with reference to FIG. 6. FIG. 6 shows, at ch1ok, ch2ok and ch3ok, the output of the respective comparators for each of the three channels, as the load is stepwise increased 610. As can be seen from the figure, as the load is stepwise increased, the signal ch1ok first goes low, followed by ch3ok. As shown in this figure, for all values of the variable load, the signal ch2ok remains high. The skilled person will appreciate that, for instance by suitable choice of the maximum value of the variable load, or by recording the value of the variable load at which the most strongly coupled channel goes low, it may be possible that this circuit, which may be implemented as shown in FIG. 3, could be utilised not only to identify which is the strongest coupled channel, but whether the coupling of the strongest couple channel is sufficient to enable reliable operation of the transponder.

It will be appreciated that, once there has been identification of the strongest coupled channel or the more strongly coupled channels, it may be possible to use this information for any of a variety of purposes. For instance and without limitation, it may be that only this (or these) channels are used for communication, whilst all available channels are used for energy harvesting. In other embodiments, all available channels are used for energy harvesting, whilst only the most strongly coupled channel or channels are used for communication. In still other embodiments, only the most strongly coupled channels are used, for both communication and harvesting. In yet other embodiments, all available channels may be used to receive data, but only the most strongly coupled channel or channels used to transmit data (whether directly, or by modulation of a received signal).

The skilled person will appreciate that, although embodiments have been described above with reference to three channels which are generally or substantially orthogonal, more or fewer than three channels may be used; moreover the channels may be orthogonal, that is to say at 90° or at right angles, to each other, or generally or substantially orthogonal, which may be considered to be within either 10 or 5° of being at 90° to each other; alternatively the channels need not be orthogonal, or generally or substantially orthogonal. The skilled person will also appreciate that, although embodiments above have been described with reference to RFID transponders or other transponders operating in the near field, the invention need not be limited thereto, and may be applicable to devices systems operating in a far field.

From reading the present disclosure, other variations and modifications will be apparent to the skilled person. Such variations and modifications may involve equivalent and other features which are already known in the art of transponders, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A transponder comprising:
    a multichannel front-end circuit, each channel of the multichannel front-end circuit including:
        a resonant circuit associated with a respective antenna and configured and arranged to produce, in use, an input voltage;
        a conditioning circuit configured to provide a conditioned input voltage from the input voltage, the conditioned input voltage representing a voltage envelope for the input voltage, and
        a comparator configured to compare the conditioned input voltage with a reference voltage;
    wherein the front-end circuit further comprises:
        a variable load circuit connectable to the resonant circuit, and
        a controller circuit configured to, in use:
            vary a variable load value for the variable load circuit,
            detect an output from each of the comparators at different variable load values, and
            determine, based upon the detected outputs at the different variable load values, relative coupling strengths for the channels of the multichannel front-end circuit.

2. A transponder according to claim 1, wherein the conditioning circuit comprises a rectifier for rectifying the input voltage.

3. A transponder according to claim 2, wherein the conditioning circuit further comprises a parallel arrangement of a capacitor and a resistor, for producing the voltage envelope from the rectified input voltage.

4. A transponder according to claim 3, wherein the variable load circuit is stepwise variable and configured to reduce the voltage envelope based upon the variable load value.

5. A transponder according to claim 1, wherein the variable load circuit includes a plurality of separate respective variable loads that are each connected across respective resonant circuits of the channels.

6. A transponder according to claim 1, wherein the antennae are configured to be coupled, in use, to the near field of the electromagnetic field.

7. A transponder according to claim 1, wherein the antennae are configured to be coupled, in use, to the far field of the electromagnetic field.

8. A method of operating a transponder having a multi-channel front-end circuit, and being in an electromagnetic field, wherein each channel comprises a resonant circuit associated with a respective antenna, the method comprising:

varying a load across each of the resonant circuits;

deriving a conditioned input voltage from a respective voltage across each of the resonant circuits;

comparing the conditioned input voltage with a predetermined reference voltage to determine a load at which the input voltage drops below the predetermined reference voltage; and determining, in response to the comparing, relative coupling strengths between the channels of the front-end circuit.

9. The method of claim 8, wherein the voltage across each resonant circuit is rectified, and then connected to a ground by a parallel arrangement of a capacitor and a resistor, to derive the respective conditioned input voltage.

10. The method of claim 8, in which a separate respective variable load is connectable across each of the resonant circuits.

11. The method of claim 8, wherein the varying a load across each of the resonant circuits comprises a stepwise variation of the load.

12. The method of claim 8, wherein the antennae are configured to be coupled, in use, to the near field of the electromagnetic field.

13. The method of claim 8, wherein the determining at least one of includes determining an order of channels in which the respective conditioned input voltages fall below the reference voltage, relative to corresponding variable load values.

* * * * *